United States Patent
Jeong

(10) Patent No.: US 11,840,225 B2
(45) Date of Patent: Dec. 12, 2023

(54) APPARATUS FOR COMPENSATING VEHICLE PULLS BY CONTROLLING VEHICLE HEIGHT, AND METHOD THEREOF

(71) Applicants: HYUNDAI MOTOR COMPANY, Seoul (KR); Kia Corporation, Seoul (KR)

(72) Inventor: Jang Hun Jeong, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 136 days.

(21) Appl. No.: 17/517,168

(22) Filed: Nov. 2, 2021

(65) Prior Publication Data

US 2022/0379885 A1 Dec. 1, 2022

(30) Foreign Application Priority Data

May 26, 2021 (KR) .................. 10-2021-0067816

(51) Int. Cl.
*B60W 30/10* (2006.01)
*B60W 10/20* (2006.01)
(Continued)

(52) U.S. Cl.
CPC ............ *B60W 30/10* (2013.01); *B60W 10/20* (2013.01); *B60W 10/22* (2013.01); *B60W 30/02* (2013.01); *B60W 40/112* (2013.01); *B60W 40/114* (2013.01); *B60W 50/14* (2013.01); *B60W 2510/22* (2013.01); *B60W 2520/125* (2013.01); *B60W 2520/14* (2013.01); *B60W 2520/18* (2013.01); *B60W 2540/18* (2013.01); *B60W 2710/22* (2013.01)

(58) Field of Classification Search
CPC ...... B60W 30/10; B60W 10/20; B60W 10/22; B60W 30/02; B60W 40/112; B60W 40/114; B60W 50/14; B60W 2510/22; B60W 2520/125; B60W 2520/14; B60W 2520/18; B60W 2540/18; B60W 2710/22
See application file for complete search history.

(56) References Cited

U.S. PATENT DOCUMENTS

| 2008/0243327 A1* | 10/2008 | Bujak | B60W 30/12 340/442 |
| 2015/0025745 A1* | 1/2015 | Tamura | B62D 5/046 701/41 |

(Continued)

FOREIGN PATENT DOCUMENTS

JP 2004-358988 A 12/2004

*Primary Examiner* — Nicholas Kiswanto
*Assistant Examiner* — Jamal A Shah
(74) *Attorney, Agent, or Firm* — MORGAN, LEWIS & BOCKIUS LLP

(57) ABSTRACT

A vehicle height adjustment control apparatus is provided for compensating for vehicle pulls including a recognition device that recognizes that a vehicle is driven straight, a determination device that determines whether the vehicle pulls of the vehicle occur, in response to recognizing that the vehicle is driven straight, and a controller that generates a warning message and calculates compensation height control information of the vehicle in response to determining that the vehicle pulls occur.

14 Claims, 5 Drawing Sheets

(51) Int. Cl.
    *B60W 10/22*     (2006.01)
    *B60W 30/02*     (2012.01)
    *B60W 40/112*     (2012.01)
    *B60W 40/114*     (2012.01)
    *B60W 50/14*     (2020.01)

(56) References Cited

U.S. PATENT DOCUMENTS

| | | | |
|---|---|---|---|
| 2015/0025771 A1* | 1/2015 | Seo | G01C 25/005 |
| | | | 701/96 |
| 2020/0156430 A1* | 5/2020 | Oakden-Graus | B60G 17/0164 |
| 2021/0370739 A1* | 12/2021 | Seo | B60G 17/0195 |

* cited by examiner

APPARATUS FOR COMPENSATING VEHICLE PULLS BY CONTROLLING VEHICLE HEIGHT, AND METHOD THEREOF

CROSS-REFERENCE TO RELATED APPLICATION

This application claims the benefit of priority to Korean Patent Application No. 10-2021-0067816, filed in the Korean Intellectual Property Office on May 26, 2021, the entire contents of which are incorporated herein by reference.

TECHNICAL FIELD

The present disclosure relates to a vehicle height adjustment control apparatus for compensating for vehicle pulls, and a method thereof.

BACKGROUND

Vehicle pulls may occur due to the alignment of vehicle wheels. In general, when vehicle pulls occur, a driver needs to steer a steering wheel to compensate for the vehicle pulls. In this case, there is a problem with safety in that it depends on the manipulation of the driver to solve the vehicle pulls.

Furthermore, when the vehicle pulls occur, there is a need for a system that temporarily compensates for the vehicle pulls until a driver operates manually. When the vehicle pulls occur, the absence of the system prevents a quick and accurate response to the vehicle pulls.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus and method that compensates for vehicle pulls by temporarily adjusting a vehicle height on a wheel when the vehicle pulls occur, generates a warning message, and notifies a driver of the occurrence of vehicle pulls.

The technical problems to be solved by the present inventive concept(s) are not limited to the aforementioned problems, and any other technical problems not mentioned herein will be clearly understood from the following description by those skilled in the art to which the present disclosure pertains.

According to an aspect of the present disclosure, a vehicle height adjustment control apparatus for compensating for vehicle pulls may include a recognition device that recognizes that a vehicle is driven straight, a determination device that determines whether the vehicle pulls of the vehicle occur, in response to recognizing that the vehicle is driven straight, and a controller that generates a warning message and calculates compensation height control information of the vehicle in response to determining that the vehicle pulls occur.

Furthermore, according to embodiments, the recognition device may recognize whether the vehicle is driven straight, based on a magnitude of a lateral acceleration of the vehicle, a longitudinal speed of the vehicle, and a magnitude of a yaw rate of the vehicle.

Moreover, according to embodiments, the recognition device may calculate a curvature of a road, on which the vehicle is driven, based on the longitudinal speed and the magnitude of the yaw rate and may recognize that the vehicle is driven straight, in response to an event that the magnitude of the lateral acceleration is less than a first threshold value and the calculated curvature is less than a second threshold value.

Also, according to embodiments, the determination device may determine whether the vehicle pulls occur, based on a magnitude of a steering angle of the vehicle and a magnitude of a steering torque of the vehicle and may determine that the vehicle pulls occur, in response to an event that the magnitude of the steering angle is greater than a third threshold value and the magnitude of the steering torque is greater than a fourth threshold value.

Besides, according to embodiments, the determination device may generate a vehicle-pull direction of the vehicle pulls and a vehicle-pull level of the vehicle pulls in response to determining that the vehicle pulls occur. The vehicle-pull direction may indicate one of a right direction and a left direction. The vehicle-pull level may be generated based on the magnitude of the steering angle and the magnitude of the steering torque.

In addition, according to embodiments, the compensation height control information may include a compensation height level and a compensation height control direction. The compensation height level may be calculated based on the vehicle-pull level. The compensation height control direction may indicate at least one of a front-right-wheel vehicle height downward direction, a front-right-wheel vehicle height upward direction, a front-left-wheel vehicle height downward direction, or a front-left-wheel vehicle height upward direction.

Furthermore, according to embodiments, the compensation height control direction included in the compensation height control information calculated by the controller may indicate at least one of the front-right-wheel vehicle height downward direction or the front-left-wheel vehicle height upward direction, in response to an event that the vehicle-pull direction indicates a right direction.

Furthermore, according to embodiments, the controller may calculate the compensation height control information based on a magnitude of a reference value obtained by dividing a current vehicle height control level of a front left wheel of the vehicle by a current vehicle height control level of a front right wheel of the vehicle, may calculate the compensation height control direction based on the current vehicle height control level of the front left wheel when the magnitude of the reference value is greater than 1, may calculate the compensation height control direction based on a current vehicle height control level of the vehicle or the current vehicle height control level of the front left wheel when the magnitude of the reference value is 1, and may calculate the compensation height control direction based on the current vehicle height control level of the front right wheel when the magnitude of the reference value is less than 1.

Furthermore, according to embodiments, the compensation height control direction included in the compensation height control information calculated by the controller may indicate at least one of the front-right-wheel vehicle height upward direction or the front-left-wheel vehicle height downward direction in response to an event that the vehicle-pull direction indicates a left direction.

Furthermore, according to embodiments, the controller may calculate the compensation height control information based on a reference value obtained by dividing a current vehicle height control level of a front left wheel of the vehicle by a current vehicle height control level of a front right wheel of the vehicle, may calculate the compensation height control direction based on the current vehicle height control level of the front left wheel when the reference value is greater than 1, may calculate the compensation height control direction based on a current vehicle height control level of the vehicle or the current vehicle height control level of the front left wheel when the reference value is 1, and may calculate the compensation height control direction based on the current vehicle height control level of the front right wheel when the reference value is less than 1.

According to an aspect of the present disclosure, a vehicle height adjustment control method for compensating for vehicle pulls may include recognizing that a vehicle is driven straight, determining whether the vehicle pulls of the vehicle occur, in response to recognizing that the vehicle is driven straight, and generating a warning message and calculating compensation height control information of the vehicle in response to determining that the vehicle pulls occur.

Furthermore, according to embodiments, the recognizing that the vehicle may be driven straight is performed based on a magnitude of a lateral acceleration of the vehicle, a longitudinal speed of the vehicle, and a magnitude of a yaw rate of the vehicle.

Moreover, according to embodiments, the recognizing that the vehicle is driven straight may include calculating a curvature of a road, on which the vehicle is driven, based on the longitudinal speed and the magnitude of the yaw rate and recognizing that the vehicle is driven straight, in response to an event that the magnitude of the lateral acceleration is less than a first threshold value and the calculated curvature is less than a second threshold value.

Also, according to embodiments, the determining of whether the vehicle pulls of the vehicle occur, in response to recognizing that the vehicle is driven straight may be performed based on a magnitude of a steering angle of the vehicle and a magnitude of a steering torque of the vehicle. The determining of whether the vehicle pulls of the vehicle occur, in response to recognizing that the vehicle is driven straight may include determining that the vehicle pulls occur, in response to an event that the magnitude of the steering angle is greater than a third threshold value and the magnitude of the steering torque is greater than a fourth threshold value.

Besides, according to embodiments, the determining of whether the vehicle pulls of the vehicle occur, in response to recognizing that the vehicle is driven straight may further include generating a vehicle-pull direction of the vehicle pulls and a vehicle-pull level of the vehicle pulls in response to determining that the vehicle pulls occur. The vehicle-pull direction may indicate one of a right direction and a left direction. The vehicle-pull level may be generated based on the magnitude of the steering angle and the magnitude of the steering torque.

In addition, according to embodiments, the compensation height control information may include a compensation height level and a compensation height control direction. The compensation height level may be calculated based on the vehicle-pull level. The compensation height control direction may indicate at least one of a front-right-wheel vehicle height downward direction, a front-right-wheel vehicle height upward direction, a front-left-wheel vehicle height downward direction, or a front-left-wheel vehicle height upward direction.

Furthermore, according to embodiments, the compensation height control direction included in the compensation height control information may indicate at least one of the front-right-wheel vehicle height downward direction or the front-left-wheel vehicle height upward direction in response to an event that the vehicle-pull direction indicates a right direction.

Moreover, according to embodiments, the generating of the warning message and the calculating of the compensation height control information of the vehicle in response to determining that the vehicle pulls occur may be performed based on a magnitude of a reference value obtained by dividing a current vehicle height control level of a front left wheel of the vehicle by a current vehicle height control level of a front right wheel of the vehicle. The generating of the warning message and the calculating of the compensation height control information of the vehicle in response to determining that the vehicle pulls occur may include calculating the compensation height control direction based on the current vehicle height control level of the front left wheel when the magnitude of the reference value is greater than 1, calculating the compensation height control direction based on a current vehicle height control level of the vehicle or the current vehicle height control level of the front left wheel when the magnitude of the reference value is 1, and calculating the compensation height control direction based on the current vehicle height control level of the front right wheel when the magnitude of the reference value is less than 1.

Also, according to embodiments, the compensation height control direction included in the compensation height control information may indicate at least one of the front-right-wheel vehicle height upward direction or the front-left-wheel vehicle height downward direction in response to an event that the vehicle-pull direction indicates a left direction.

Besides, according to embodiments, the generating of the warning message and the calculating of the compensation height control information of the vehicle in response to determining that the vehicle pulls occur may be performed based on a reference value obtained by dividing a current vehicle height control level of a front left wheel of the vehicle by a current vehicle height control level of a front right wheel of the vehicle. The generating of the warning message and the calculating of the compensation height control information of the vehicle in response to determining that the vehicle pulls occur may include calculating the compensation height control direction based on the current vehicle height control level of the front left wheel when the reference value is greater than 1, calculating the compensation height control direction based on a current vehicle height control level of the vehicle or the current vehicle height control level of the front left wheel when the reference value is 1, and calculating the compensation height control direction based on the current vehicle height control level of the front right wheel when the reference value is less than 1.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
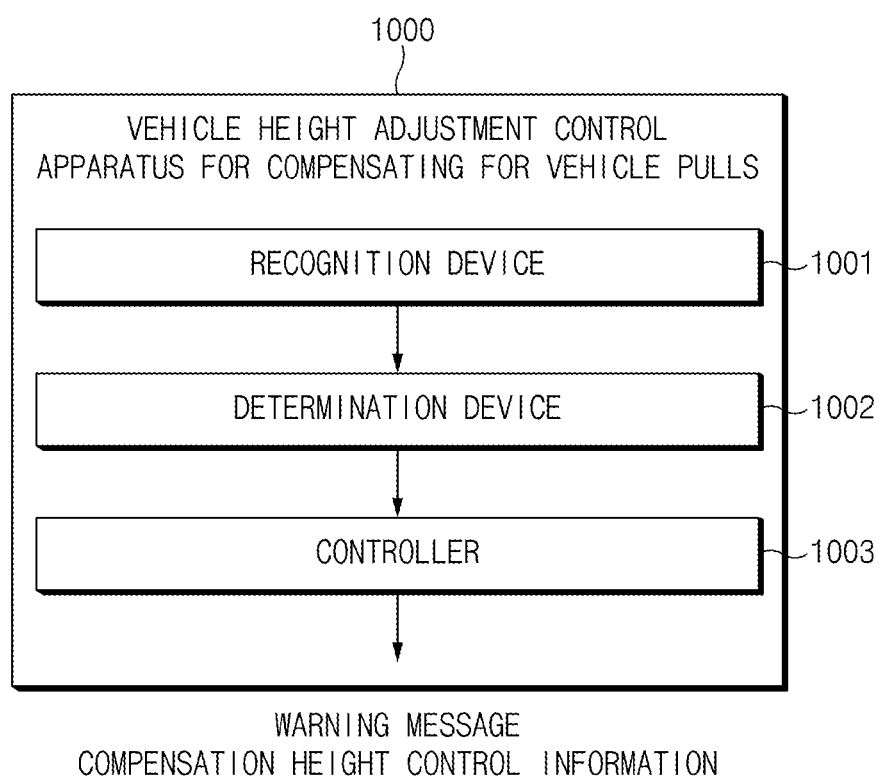
FIG. 1 illustrates an example of a vehicle height adjustment apparatus for compensating for vehicle pulls, according to embodiments.

Hereinafter, exemplary embodiments of the present disclosure will be described in detail with reference to the accompanying drawings. In adding reference numerals to components of each drawing, it should be noted that the same components have the same reference numerals, although they are indicated on another drawing. In describing the embodiments of the present disclosure, detailed descriptions associated with well-known functions or configurations will be omitted when they may make subject matters of the present disclosure unnecessarily obscure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 5.

FIG. 1 illustrates an example of a vehicle height adjustment control apparatus for compensating for vehicle pulls, according to embodiments.

FIG. 1 is a schematic diagram illustrating an example of a vehicle height adjustment control apparatus (or device) for compensating for vehicle pulls, according to embodiments. An apparatus 1000 according to embodiments may include a recognition device 1001, a determination device 1002, and/or a controller 1003. The apparatus 1000 according to embodiments may further include one or more elements not shown in FIG. 1.

The apparatus 1000 according to an exemplary embodiment of the present disclosure may include a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed, compensates for vehicle pulls, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit.

The processor may embody one or more processor(s). The apparatus 1000 has an associated non-transitory memory storing software instructions which, when executed by the processor of the apparatus 1000, provides the functionalities of preventing vehicle pulls by adjusting the vehicle height of a vehicle (or an autonomous vehicle). A vehicle according to embodiments may include four or more wheels, and the four or more wheels may include a front right wheel, a front left wheel, a rear right wheel, and/or a rear left wheel. The vehicle pulls of a vehicle according to embodiments may occur due to the defect of the wheel alignment of the front right wheel and the front left wheel. When the vehicle pulls occur, until a driver compensates for steering, the apparatus according to embodiments may temporarily provide vehicle-pull compensation by adjusting a vehicle height. In addition, according to embodiments, it is possible to provide efficient vehicle-pull compensation by appropriately adjusting a vehicle height depending on the degree of vehicle pulls. For example, the apparatus 1000 may compensate for vehicle pulls by controlling the vehicle height through adjusting the downward/upward direction of a front-right-wheel vehicle height and/or a front-left-wheel vehicle height depending on the degree of vehicle pulls. According to embodiments, the front-right-wheel vehicle height may indicate the vehicle height of a front right wheel of a vehicle; and, the front-left-wheel vehicle height may indicate the vehicle height of a front left wheel of a vehicle. In other words, the upward direction of a front-right-wheel vehicle height may indicate the upward direction of the vehicle height of a front right wheel of a vehicle. The downward direction of a front-left-wheel vehicle height may indicate a downward direction of the vehicle height of a front left wheel of a vehicle. A method of expressing a vehicle height control direction of a vehicle according to embodiments is not limited to the above-described example.

The recognition device 1001 of the apparatus according to an exemplary embodiment of the present disclosure may be a processor (e.g., computer, microprocessor, CPU, ASIC, circuitry, logic circuits, etc.). Such processor having an associated non-transitory memory storing software instructions which, when executed by the processor, may recognize whether a vehicle is driven straight. For example, the recognition device 1001 may recognize whether a vehicle is driven straight, based on the magnitude of the vehicle's lateral acceleration, the vehicle's longitudinal speed, and/or the magnitude of the vehicle's yaw rate. The vehicle's longitudinal speed may indicate the traveling direction speed of the vehicle. The yaw rate may indicate a speed at which a vehicle's rotation angle changes with respect to a vertical line passing through the center of the vehicle. The yaw rate may be variously referred to as a "yaw angular speed". The recognition device 1001 may take the form of one or more processor(s) and associated memory storing program instructions.

The determination device 1002 of the apparatus according to an exemplary embodiment of the present disclosure may be a processor (e.g., computer, microprocessor, CPU, ASIC, circuitry, logic circuits, etc.). The determination device 1002 having an associated non-transitory memory storing software instructions which, when executed by the processor, may determine whether vehicle pulls occur, in response to recognizing that the vehicle is driven straight. That is, the determination device 1002 may operate in response to an event that the recognition device 1001 recognizes that a vehicle is driven straight. For example, the determination device 1002 may determine whether the vehicle pulls occur, based on the magnitude of the steering angle and/or the magnitude of the steering torque of the vehicle. The determination device 1002 may take the foam of one or more processor(s) and associated memory storing program instructions.

The determination device 1002 according to embodiments may further generate information about the above-described vehicle pulls in response to determining that vehicle pulls occur. For example, the determination device 1002 may generate a vehicle-pull direction and an extent to which vehicle pulls occur (hereinafter, referred to as a "vehicle-pull level"), in response to determining that vehicle pulls occur. The vehicle-pull direction according to embodiments may indicate a direction in which vehicle pulls occur, and may indicate one of a right direction and a left direction. The vehicle-pull level according to embodiments indicates an extent to which vehicle pulls occur. For example, the vehicle-pull level may be generated for respective steps from −5 to +5 depending on the magnitude of the steering angle and the magnitude of the steering torque.

In response to determining that vehicle pulls occur, the controller 1003 of the apparatus according to an exemplary embodiment of the present disclosure may be a processor (e.g., computer, microprocessor, CPU, ASIC, circuitry, logic circuits, etc.). The controller 1003 having an associated non-transitory memory storing software instructions which, when executed by the processor, may generate a warning message and then may calculate compensation height control information of a vehicle. That is, the controller 1003 may operate in response to an event that the determination device 1002 determines that vehicle pulls occur. The warning message according to embodiments may correspond to a message indicating that vehicle pulls occur. The warning message may be displayed in a vehicle. The compensation height control information according to embodiments indicates information for controlling the vehicle height of a vehicle to compensate for the above-described vehicle pulls. The compensation height control information according to embodiments may include a compensation height level and/or a compensation height control direction. The compensation height control direction may indicate at least one of a front-right-wheel vehicle height downward direction, a front-right-wheel vehicle height upward direction, a front-left-wheel vehicle height downward direction, or a front-left-wheel vehicle height upward direction. The compensation height level may indicate the level of a vehicle height controlled in a direction corresponding to the compensation height control direction. For example, the compensation height control information may indicate 5 mm in a downward direction of the front-right-wheel vehicle height. The controller 1003 may take the form of one or more processor(s) and associated memory storing program instructions.

When vehicle pulls occur, the apparatus 1000 according to embodiments may temporarily prevent vehicle pulls by compensating for a vehicle height through the method described in this drawing. Besides, the apparatus 1000 may provide efficient vehicle-pull compensation by appropriately adjusting a vehicle height depending on an extent to which vehicle pulls occur.

Figure 2:
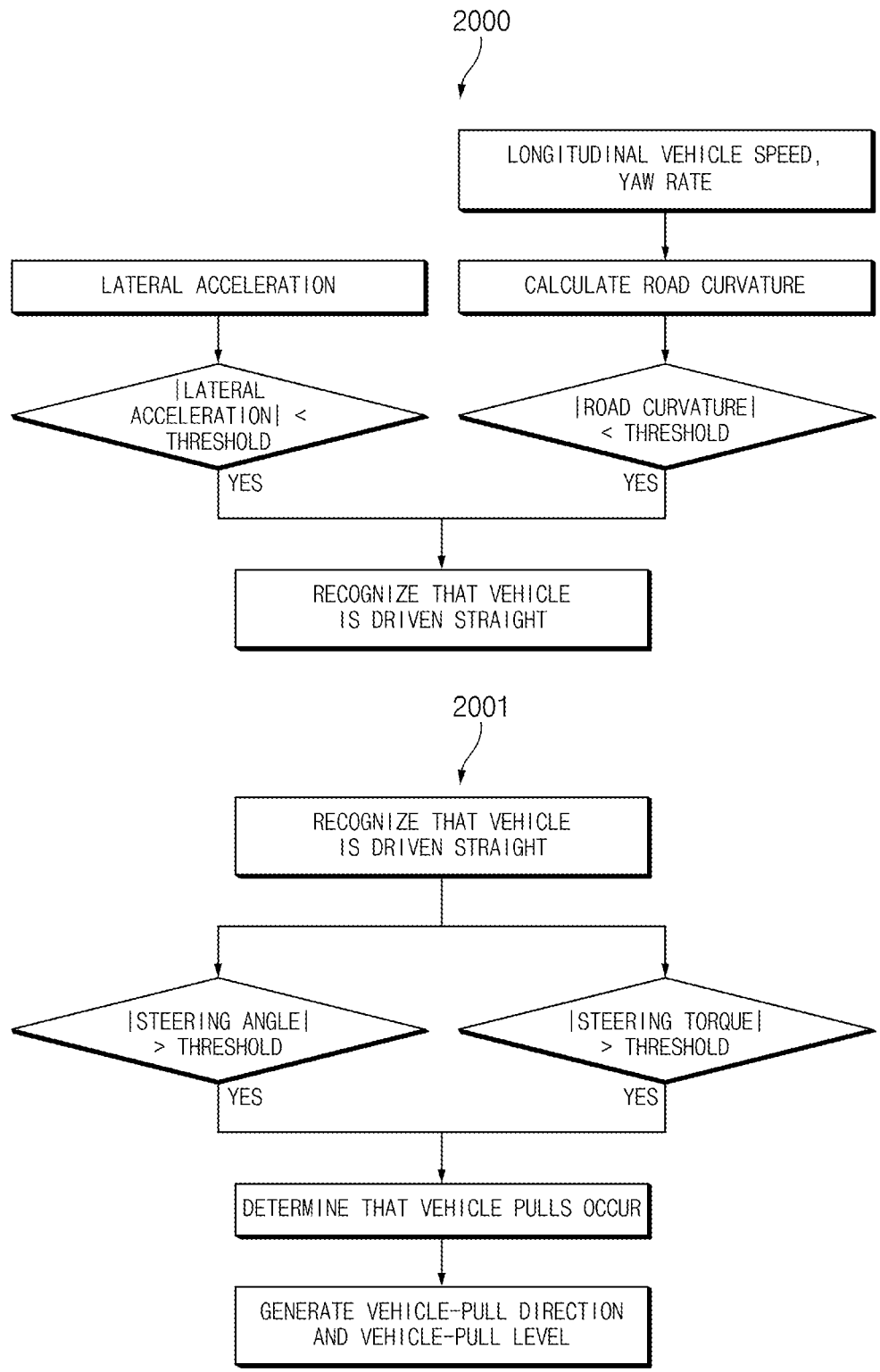
FIG. 2 illustrates an example of operations of a recognition device and a determination device, according to embodiments.

FIG. 2 illustrates an example of operations of a recognition device and a determination device, according to embodiments.

FIG. 2 is a view for describing operations of a recognition device (the recognition device 1001 of FIG. 1) and a determination device (the determination device 1002 of FIG. 1), according to embodiments. Reference numeral 2000 indicates a flowchart describing the operation of the recognition device, according to embodiments. Reference numeral 2001 indicates a flowchart describing the operation of the determination device, according to embodiments.

As described above in FIG. 1, the recognition device according to embodiments may determine whether a vehicle is driven straight, based on a lateral acceleration, a longitudinal speed (or vehicle speed), and/or a yaw rate. The recognition device according to embodiments may calculate a curvature of a road, on which the vehicle is driven, based on the longitudinal vehicle speed and the yaw rate. The recognition device according to embodiments may recognize whether the vehicle is driven straight, based on the magnitude of the lateral acceleration and the above-described calculated curvature. For example, the recognition device may recognize that the vehicle is driven straight, in response to an event that the magnitude of the lateral acceleration is less than a first threshold value and the calculated curvature is less than a second threshold value. According to embodiments, the first threshold value and the second threshold value may correspond to a threshold value set by a user or a value calculated by an apparatus according to embodiments.

As described above with reference to FIG. 1, the determination device according to embodiments may determine whether vehicle pulls occur, in response to recognizing that the vehicle is driven straight. Furthermore, the determination device may determine whether vehicle pulls occur, based on the magnitude of the steering angle and the magnitude of the steering torque of the vehicle. For example, the determination device may determine that vehicle pulls occur, in response to an event that the magnitude of the steering angle is greater than a third threshold value and the magnitude of the steering torque is greater than a fourth threshold value. According to embodiments, the third threshold value and the fourth threshold value may correspond to a threshold value set by a user or a value calculated by an apparatus according to embodiments.

As described above with reference to FIG. 1, the determination device according to embodiments may generate the vehicle-pull direction and/or the vehicle-pull level of the above-mentioned vehicle pulls, in response to determining that the vehicle pulls occur. The detailed description of the vehicle-pull direction and the vehicle-pull level is the same as or similar to that described above in FIG. 1.

When vehicle pulls occur, the apparatus according to embodiments may temporarily prevent vehicle pulls by compensating for a vehicle height through the method described in this drawing. Besides, the apparatus may provide efficient vehicle-pull compensation by appropriately adjusting a vehicle height depending on an extent to which vehicle pulls occur.

Figure 3:
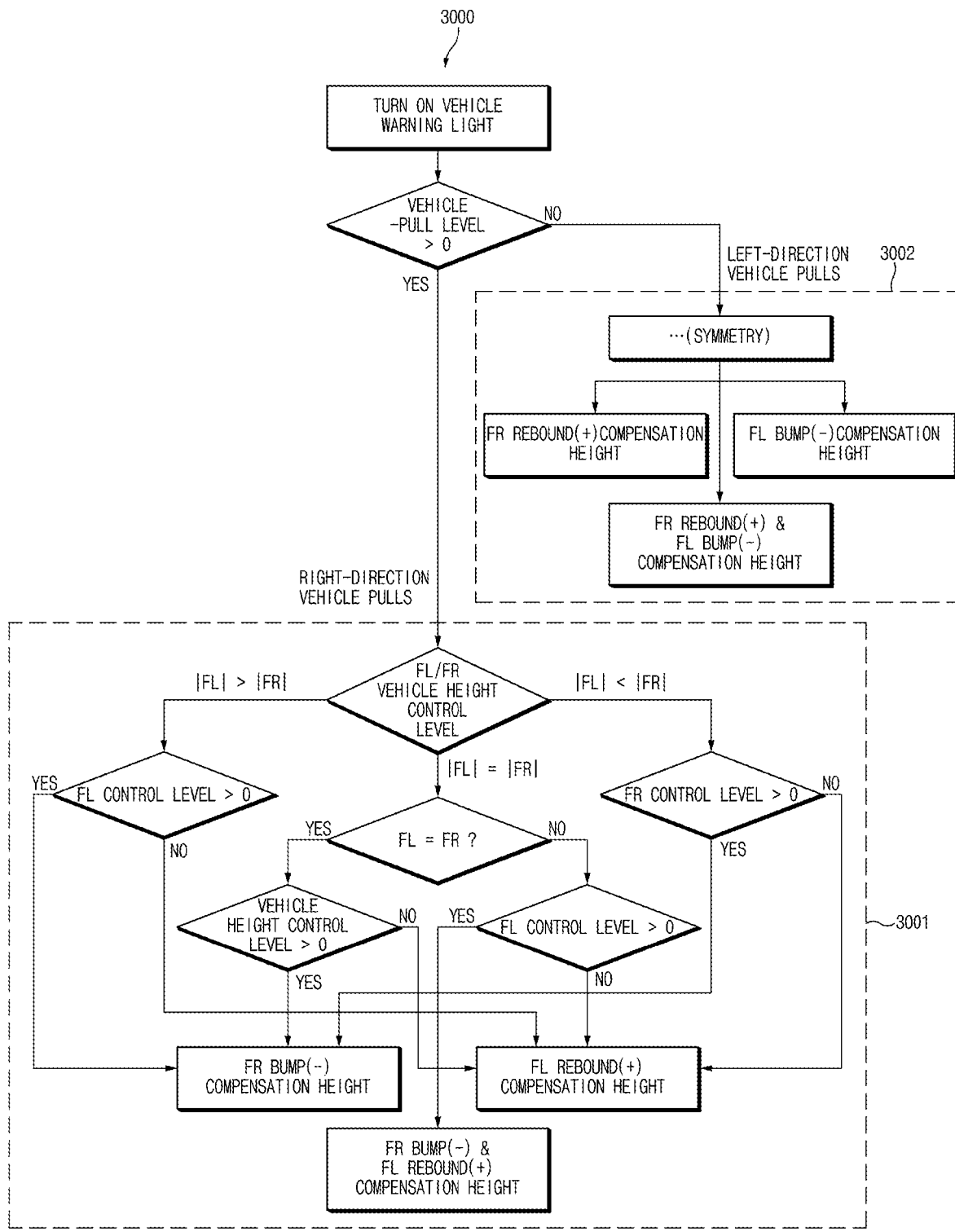
FIG. 3 illustrates an example of an operation of a controller, according to embodiments.

FIG. 3 illustrates an example of an operation of a controller, according to embodiments.

FIG. 3 is a view for describing an operation of a controller (the controller 1003 of FIG. 1), according to embodiments. Reference numeral 3000 indicates a flowchart describing the operation of the controller, according to embodiments. The operation of the controller according to embodiments is not limited to the examples described in FIG. 3.

As described above with reference to FIG. 1, in response to determining that vehicle pulls occur (the vehicle pulls described in FIGS. 1 to 2), the controller according to embodiments may generate a warning message and then may calculate compensation height control information of a vehicle. According to embodiments, the detailed description of the warning message and the compensation height control information is the same as or similar to that described with reference to FIG. 1.

In reference numeral 3000, turning on a vehicle warning light may indicate displaying the above-described warning message.

As described above with reference to FIGS. 1 and 2, the determination device according to embodiments may generate a vehicle-pull direction and a vehicle-pull level of vehicle pulls, in response to determining that the vehicle pulls occur. The detailed description of the vehicle-pull direction and the vehicle-pull level is the same as or similar to that described above in FIGS. 1 and 2.

The controller according to embodiments may generate the compensation height control information depending on the vehicle-pull direction. As described above with reference to FIGS. 1 to 2, the vehicle-pull direction may indicate one of a right direction and a left direction. That is, a method in which the controller generates compensation height control information with respect to right-direction vehicle pulls and left-direction vehicle pulls may be different.

When the determination device according to embodiments determines that the generated vehicle-pull level is greater than 0, the vehicle-pull direction may indicate a right direction. When the determination device according to embodiments determines that the generated vehicle-pull level is less than 0, the vehicle-pull direction may indicate a left direction. According to embodiments, when the vehicle-pull direction indicates a right direction, reference numeral 3001 indicates that the determination device generates compensation height control information. According to embodiments, when the vehicle-pull direction indicates a left direction, reference numeral 3002 indicates that the determination device generates compensation height control information.

The vehicle height of a vehicle according to embodiments may be adjusted by controlling an actuator included in the vehicle. The method of controlling the vehicle height of the vehicle according to embodiments is not limited to the above-described example.

A wheel according to embodiments may be supported by an upper link and a lower link. Besides, the wheel may be inclined in a yaw direction depending on the upper link and the lower link. In general, when a load is applied to a vehicle, a wheel may be inclined such that the upper portion of the wheel is closer to the side of a vehicle body than the lower portion of the wheel. In this case, an angle generated with respect to a vertical line of a yaw direction as the upper portion of the wheel is inclined toward the vehicle body may be referred to as a "toe angle". That is, as the toe angle increases, the upper portion of the wheel is inclined closer to the vehicle body.

When the vehicle height of a vehicle according to embodiments is adjusted, a vehicle may have an effect identical or similar to an event that the toe angle of the vehicle is adjusted. For example, when the vehicle height of the vehicle decreases, the toe angle of a wheel on the side of the decreased vehicle height increases.

As described above, the determination device may solve the vehicle pulls based on the compensation height control information considering the vehicle height of a current vehicle. For example, in the determination device, the generated compensation height control direction (the compensation height control direction described in FIG. 1) may indicate at least one of a front-right-wheel vehicle height downward direction or a front-left-wheel vehicle height upward direction in response to an event that the vehicle-pull direction indicates a right direction. Furthermore, in the determination device, the generated compensation height control direction may indicate at least one of a front-left-wheel vehicle height upward direction or a front-right-wheel vehicle height downward direction in response to an event that the vehicle-pull direction indicates a left direction.

According to embodiments, the controller may calculate compensation height control information based on the magnitude of the reference value obtained by dividing the current vehicle height control level of the vehicle's front left wheel by the current vehicle height control level of the vehicle's front right wheel, in response to an event that the vehicle-pull direction indicates a right direction. That is, the determination device generates the compensation height control information based on the vehicle's current vehicle height control level. The magnitude of a reference value according to embodiments may indicate an absolute value of the reference value. For example, when the reference value is −3, the magnitude of the reference value is 3.

When the magnitude of the reference value is greater than 1, the controller according to embodiments may calculate a compensation height control direction based on the current vehicle height control level of a front left wheel. A case that the magnitude of the reference value is greater than 1 may indicate a case that a current vehicle height control level of the front left wheel is greater than a current vehicle height control level of the front right wheel. For example, the case that the magnitude of the reference value is greater than 1 indicates that a load on a front left side is greater than a load on a front right side.

When the magnitude of the reference value is greater than 1, the controller according to embodiments may calculate a compensation height control direction based on whether the current vehicle height control level of the front left wheel is greater than 0. In detail, when the current vehicle height control level of the front left wheel is greater than 0, the compensation height control direction calculated by the controller may indicate the front-left-wheel vehicle height downward direction. When the current vehicle height control level of the front left wheel is less than or equal to 0, the compensation height control direction calculated by the controller may indicate the front-right-wheel vehicle height upward direction.

When the magnitude of the reference value is less than 1, the controller according to embodiments may calculate a compensation height control direction based on the current vehicle height control level of a front right wheel. A case that the magnitude of the reference value is less than 1 may indicate a case that a current vehicle height control level of the front right wheel is greater than a current vehicle height control level of the front left wheel. For example, the case that the magnitude of the reference value is less than 1 indicates that a load on a front right side is greater than a load on a front left side.

When the magnitude of the reference value is less than 1, the controller according to embodiments may calculate a compensation height control direction based on whether the current vehicle height control level of the front right wheel is greater than 0. In detail, when the current vehicle height control level of the front right wheel is greater than 0, the compensation height control direction calculated by the controller may indicate the front-right-wheel vehicle height downward direction. When the current vehicle height control level of the front right wheel is less than or equal to 0, the compensation height control direction calculated by the controller may indicate the front-left-wheel vehicle height upward direction. FR Bump(−) in reference numeral 3001 indicates the above-mentioned front-right-wheel vehicle height downward direction. FR Rebound(+) in reference numeral 3001 indicates the above-described front-left-wheel vehicle height upward direction.

When the magnitude of the reference value is 1, the controller according to embodiments may calculate a compensation height control direction based on the vehicle's current vehicle height control level or the current vehicle height control level of the front left wheel. The case that the magnitude of the reference value is 1 may indicate a case that a current vehicle height control level of the front left wheel is the same as a current vehicle height control level of the front right wheel. For example, the case that the magnitude of the reference value is 1 indicates that a load on a front right side is the same as a load on a front left side.

When the magnitude of the reference value is 1, first of all, the controller according to embodiments may determine whether the current vehicle height control level of the front left wheel is the same as the current vehicle height control level of the front right wheel. For example, when FL is +10 mm and FR is −10 mm, the magnitude of the above-mentioned reference value is 1, but the current vehicle height control level of the front left wheel is not the same as the current vehicle height control level of the front right wheel. For example, when FL is +10 mm and FR is +10 mm, the magnitude of the above-mentioned reference value is 1, and the current vehicle height control level of the front left wheel is the same as the current vehicle height control level of the front right wheel.

When the magnitude of the reference value is 1 and the current vehicle height control level of the front left wheel is the same as the current vehicle height control level of the front right wheel, the controller according to embodiments may calculate a compensation height control direction based on the current vehicle height control level. In detail, when the current vehicle height control level is greater than 0 (e.g., FL=FR=+10), the compensation height control direction calculated by the controller may indicate the front-right-wheel vehicle height downward direction. When the current vehicle height control level is less than or equal to 0, the compensation height control direction calculated by the controller may indicate the front-left-wheel vehicle height upward direction.

When the magnitude of the reference value is 1 and the current vehicle height control level of the front left wheel is not the same as the current vehicle height control level of the front right wheel, the controller according to embodiments may calculate a compensation height control direction based on the current vehicle height control level of the front left wheel.

In detail, when the vehicle height control level of the front left wheel is greater than 0, the compensation height control direction calculated by the controller may simultaneously indicate the front-left-wheel vehicle height downward direction and the front-right-wheel vehicle height upward direction. That is, the controller may allocate half of the compensation height control level calculated based on the vehicle-pull level to each of the front-right-wheel vehicle height downward direction and the front-left-wheel upward direction. For example, when the compensation height control level calculated based on the vehicle-pull level is +10 mm, the controller may compensate for a vehicle height by 5 mm with respect to each of the front-right-wheel vehicle height downward direction and the front-left-wheel upward direction.

Moreover, in detail, when the vehicle height control level of the front left wheel is less than or equal to 0, the compensation height control direction calculated by the controller may indicate the front-left-wheel vehicle height upward direction. When the vehicle-pull direction according to embodiments is a left direction, a method in which the determination device calculates a compensation height control direction may be symmetric with respect to a case that the vehicle-pull direction is a right direction.

In the determination device according to embodiments, the generated compensation height control direction (the compensation height control direction described in FIG. 1) may indicate at least one of a front-right-wheel vehicle height upward direction or a front-left-wheel vehicle height downward direction in response to an event that the vehicle-pull direction indicates a left direction. FR Rebound in reference numeral 3002 indicates the above-described front-right-wheel vehicle height upward direction. FR Bump in reference numeral 3002 indicates the above-mentioned front-left-wheel vehicle height downward direction.

According to embodiments, the controller may calculate compensation height control information based on the magnitude of the reference value obtained by dividing the current vehicle height control level of the vehicle's front left wheel by the current vehicle height control level of the vehicle's front right wheel, in response to an event that the vehicle-pull direction indicates a left direction. That is, the determination device generates the compensation height control information based on the vehicle's current vehicle height control level. The description of the reference value is the same as that described above.

When the magnitude of the reference value is greater than 1, the controller according to embodiments may calculate a compensation height control direction based on the current vehicle height control level of a front left wheel. A case that the magnitude of the reference value is greater than 1 may indicate a case that a current vehicle height control level of the front left wheel is greater than a current vehicle height control level of the front right wheel. For example, the case that the magnitude of the reference value is greater than 1 indicates that a load on a front left side is greater than a load on a front right side.

When the magnitude of the reference value is greater than 1, the controller according to embodiments may calculate a compensation height control direction based on whether the current vehicle height control level of the front left wheel is greater than 0. In detail, when the current vehicle height control level of the front left wheel is greater than 0, the compensation height control direction calculated by the controller may indicate the front-left-wheel vehicle height downward direction. When the current vehicle height control level of the front left wheel is less than or equal to 0, the compensation height control direction calculated by the controller may indicate the front-right-wheel vehicle height upward direction.

When the magnitude of the reference value is less than 1, the controller according to embodiments may calculate a compensation height control direction based on the current vehicle height control level of a front right wheel. A case that the magnitude of the reference value is less than 1 may indicate a case that a current vehicle height control level of the front right wheel is greater than a current vehicle height control level of the front left wheel. For example, the case that the magnitude of the reference value is less than 1 indicates that a load on a front right side is greater than a load on a front left side.

When the magnitude of the reference value is less than 1, the controller according to embodiments may calculate a compensation height control direction based on whether the current vehicle height control level of the front right wheel is greater than 0. In detail, when the current vehicle height control level of the front right wheel is greater than 0, the compensation height control direction calculated by the controller may indicate the front-right-wheel vehicle height downward direction. When the current vehicle height control level of the front right wheel is less than or equal to 0, the compensation height control direction calculated by the controller may indicate the front-left-wheel vehicle height upward direction.

When the magnitude of the reference value is 1, the controller according to embodiments may calculate a compensation height control direction based on the vehicle's current vehicle height control level or the current vehicle height control level of the front left wheel. A case that the magnitude of the reference value is 1 may indicate a case that a current vehicle height control level of the front left wheel is the same as a current vehicle height control level of the front right wheel. For example, the case that the magnitude of the reference value is 1 indicates that a load on a front right side is the same as a load on a front left side.

When the magnitude of the reference value is 1, first of all, the controller according to embodiments may determine whether the current vehicle height control level of the front left wheel is the same as the current vehicle height control level of the front right wheel. For example, when FL is +10 mm and FR is −10 mm, the magnitude of the above-mentioned reference value is 1, but the current vehicle height control level of the front left wheel is not the same as the current vehicle height control level of the front right wheel. For example, when FL is +10 mm and FR is +10 mm, the magnitude of the above-mentioned reference value is 1, and the current vehicle height control level of the front left wheel is the same as the current vehicle height control level of the front right wheel.

When the magnitude of the reference value is 1 and the current vehicle height control level of the front left wheel is the same as the current vehicle height control level of the front right wheel, the controller according to embodiments may calculate a compensation height control direction based on the current vehicle height control level. In detail, when the current vehicle height control level is greater than 0 (e.g., FL=FR=+10), the compensation height control direction calculated by the controller may indicate the front-left-wheel vehicle height downward direction. When the current vehicle height control level is less than or equal to 0, the compensation height control direction calculated by the controller may indicate the front-right-wheel vehicle height upward direction.

When the magnitude of the reference value is 1 and the current vehicle height control level of the front left wheel is not the same as the current vehicle height control level of the front right wheel, the controller according to embodiments may calculate a compensation height control direction based on the current vehicle height control level of the front left wheel.

In detail, when the vehicle height control level of the front left wheel is greater than 0, the compensation height control direction calculated by the controller may simultaneously indicate the front-left-wheel vehicle height downward direction and the front-right-wheel vehicle height upward direction. That is, the controller may allocate half of the compensation height control level calculated based on the vehicle-pull level to each of the front-left-wheel vehicle height downward direction and the front-right-wheel upward direction. For example, when the compensation height control level calculated based on the vehicle-pull level is +10 mm, the controller may compensate for a vehicle height by 5 mm with respect to each of the front-left-wheel vehicle height downward direction and the front-right-wheel upward direction.

Moreover, in detail, when the vehicle height control level of the front left wheel is less than or equal to 0, the compensation height control direction calculated by the controller may indicate the front-left-wheel vehicle height upward direction.

When vehicle pulls occur, the apparatus according to embodiments may temporarily prevent vehicle pulls by compensating for a vehicle height through the method described in this drawing. Besides, the apparatus may provide efficient vehicle-pull compensation by appropriately adjusting a vehicle height depending on an extent to which vehicle pulls occur.

Figure 4:
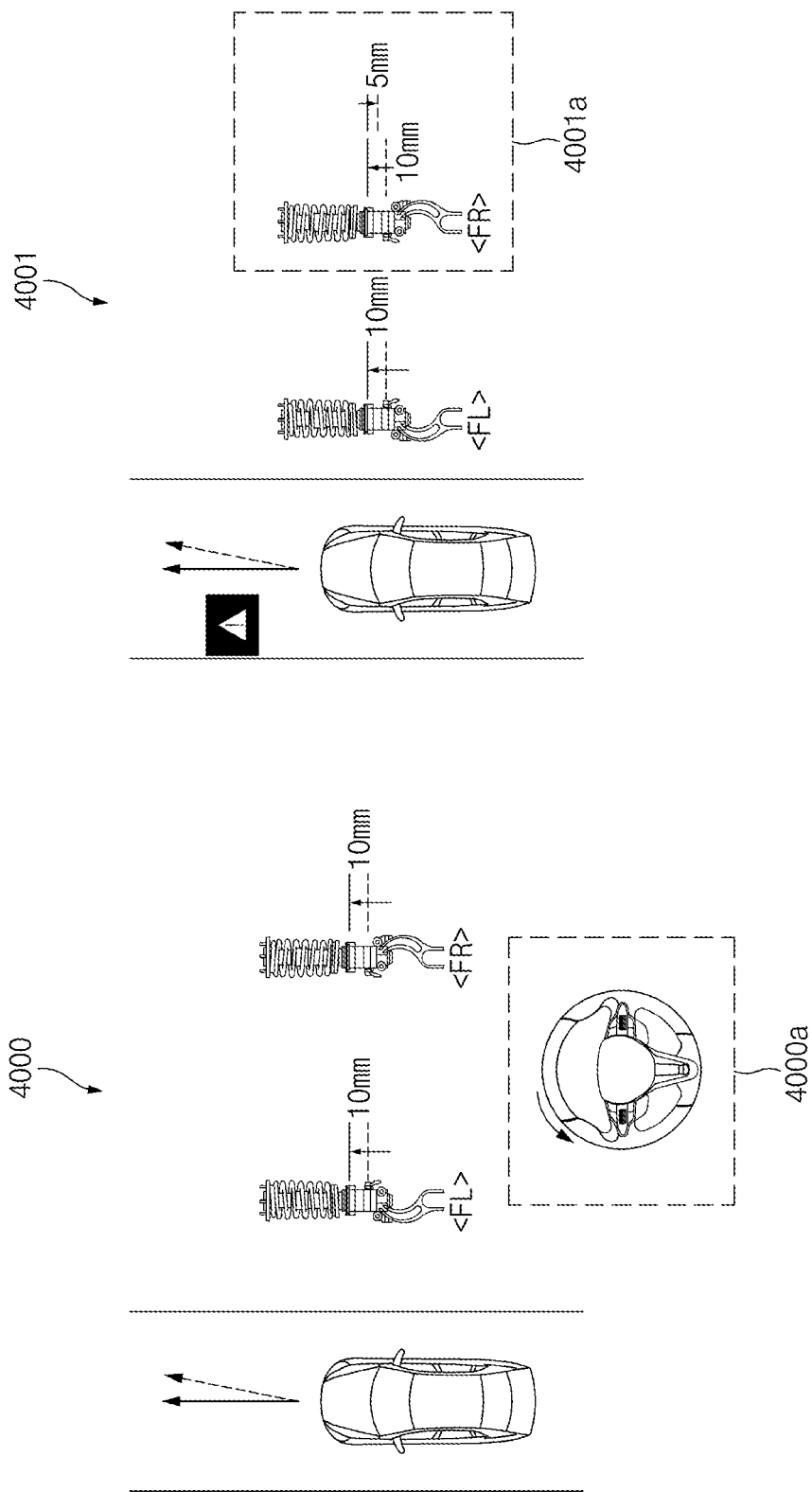
FIG. 4 illustrates an example of a vehicle height adjustment process for compensating for vehicle pulls, according to embodiments.

FIG. 4 illustrates an example of a vehicle height adjustment process for compensating for vehicle pulls, according to embodiments.

FIG. 4 is a view for describing an example of a vehicle height adjustment process, in which a vehicle compensates for vehicle pulls, according to embodiments. As described above in FIG. 3, a vehicle according to embodiments may compensate for the vehicle pulls by adjusting a vehicle height of the vehicle by a wheel. In particular, the vehicle according to embodiments may compensate for the vehicle pulls by adjusting the vehicle height by a front left wheel and/or the vehicle height by a front right wheel.

Both reference numeral 4000 and reference numeral 4001 indicate that the vehicle height of a current vehicle is increased by 10 mm by the front left wheel and the front right wheel. For example, the vehicle may increase both the front left wheel and the front right wheel by 10 mm in response to a driver's payload.

Both reference numeral 4000 and reference numeral 4001 indicate that right-direction vehicle pulls occur with respect to a vehicle. For example, both reference numeral 4000 and reference numeral 4001 indicate that right-direction vehicle pulls occur because a wheel alignment (the wheel alignment described in FIG. 1) of the vehicle is inclined to a right direction.

Reference numeral 4000 indicates that the vehicle compensates for the vehicle pulls through the driver's steering without a vehicle height adjustment process, according to embodiments.

That is, in this case, a current vehicle height of the vehicle is maintained uniformly, thereby compensating for the vehicle pulls based on the driver's manual operation. For example, in response to an event that right-direction vehicle pulls occur, the driver of the vehicle may compensate for the right-direction vehicle pulls by steering a steering wheel in a left direction (4000a).

Reference numeral 4001 indicates that the vehicle compensates for vehicle pulls based on a vehicle height adjustment process, according to embodiments.

As described above in FIG. 3, the vehicle may compensate for the vehicle pulls by adjusting a vehicle height (an extent to which a wheel is inclined) of the vehicle by a wheel corresponding to a wheel direction in which the vehicle pulls occur. Besides, the vehicle may compensate for the above-mentioned vehicle pulls by decreasing the vehicle height of the vehicle by a wheel corresponding to a wheel direction in which the vehicle pulls occur, or by increasing the vehicle height of the vehicle by a wheel corresponding to a direction opposite to the wheel direction in which the vehicle pulls occur. For example, the vehicle may compensate for the right-direction vehicle pulls by decreasing the front right wheel supporting the vehicle height of 10 mm by 5 mm in a downward direction (4001*a*) in response to an event that right-direction vehicle pulls occur.

When vehicle pulls occur, an apparatus according to embodiments may temporarily prevent vehicle pulls by compensating for a vehicle height through the method described in this drawing. Besides, the apparatus may provide efficient vehicle-pull compensation by appropriately adjusting a vehicle height depending on an extent to which vehicle pulls occur.

Figure 5:
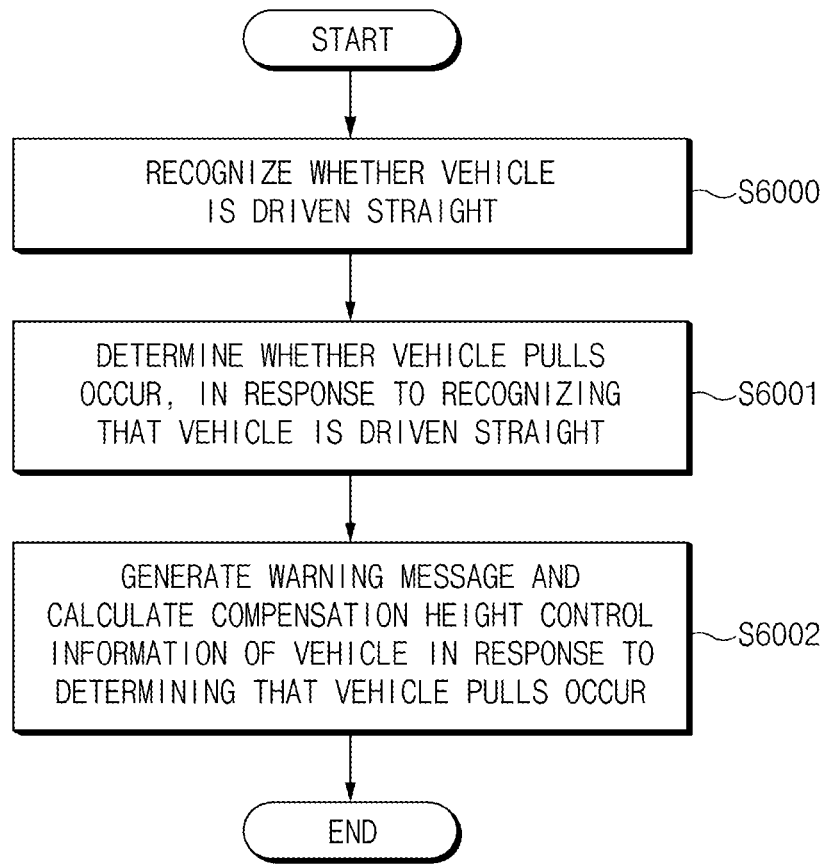
FIG. 5 is a flowchart for describing a vehicle height adjustment process for compensating for vehicle pulls, according to embodiments.

FIG. 5 illustrates an example of a vehicle height adjustment method for compensating for vehicle pulls, according to embodiments.

FIG. 5 is a flowchart illustrating an example of a vehicle height adjustment method (or a method) for compensating for vehicle pulls, according to embodiments. An apparatus (a vehicle height adjustment apparatus for compensating for vehicle pulls) described in FIGS. 1 to 5 may perform a method described with reference to FIG. 5.

A step according to embodiments may include step S6000 of recognizing whether a vehicle is driven straight, step S6001 of determining whether vehicle pulls occur, in response to recognizing that a vehicle is driven straight, and/or step S6002 of generating a warning message and calculating compensation height control information of a vehicle in response to determining that vehicle pulls occur. A method according to embodiments may further include one or more steps not shown in FIG. 5.

Step S6000 according to embodiments may be performed by the recognition device 1001 of FIG. 1.

Step S6000 according to embodiments may be performed based on the magnitude of the lateral acceleration of a vehicle, the longitudinal speed of the vehicle, and the magnitude of the yaw rate of the vehicle. According to embodiments, descriptions of the magnitude of the lateral acceleration of the vehicle, the longitudinal speed of the vehicle, and the magnitude of the yaw rate of the vehicle are the same as or similar to those described above with reference to FIGS. 1 and 2.

Step S6000 according to embodiments may include calculating a curvature of a road, on which the vehicle is driven, based on the longitudinal speed and the magnitude of a yaw rate, and/or recognizing that the vehicle is driven straight, in response to an event that the magnitude of the lateral acceleration is less than a first threshold value and the calculated curvature is less than a second threshold value. The descriptions of the above-described steps are the same as or similar to those described in association with reference numeral 2000 of FIG. 2.

Step S6001 according to embodiments may be performed by the determination device 1002 of FIG. 1.

Step S6001 according to embodiments may be performed based on the magnitude of a steering angle of the vehicle and the magnitude of a steering torque of the vehicle. Step S6001 according to embodiments may include determining that vehicle pulls occur, in response to an event that the magnitude of the steering angle is greater than a third threshold value and the magnitude of the steering torque is greater than a fourth threshold value. The descriptions of the magnitude of a steering angle, the magnitude of a steering torque, and the steps, which are described above, are the same as or similar to those described in association with reference numeral 2001 of FIG. 2.

Step S6001 according to embodiments may further include generating a vehicle-pull direction and a vehicle-pull level of vehicle pulls in response to determining that the vehicle pulls occur. According to embodiments, the vehicle-pull direction may indicate one of a right direction and a left direction. The vehicle-pull level may be generated based on the magnitude of the steering angle and the magnitude of the steering torque. The descriptions of the step, the vehicle-pull direction, and the vehicle-pull level, which are described above, are the same as or similar to those described above with respect to FIGS. 1 and 2.

The compensation height control information according to embodiments may include a compensation height level and a compensation height control direction. The compensation height level according to embodiments may be calculated based on a vehicle-pull level. The compensation height control direction may indicate at least one of a downward direction of a front right wheel, an upward direction of a front right wheel, a downward direction of a front left wheel, or an upward direction of a front left wheel. The detailed description of the above-described compensation height control information is the same as or similar to that described above in FIGS. 1 and 4.

According to embodiments, the compensation height control direction included in the compensation height control information may indicate at least one of a front-right-wheel vehicle height downward direction or a front-left-wheel vehicle height upward direction in response to an event that the vehicle-pull direction indicates a right direction.

Step S6001 according to embodiments may be performed based on the magnitude of the reference value obtained by dividing a current vehicle height control level of the vehicle's front-left-wheel vehicle height by a current vehicle height control level of the vehicle's front-right-wheel vehicle height. Step S6001 according to embodiments may include calculating a compensation height control direction based on a current vehicle height control level of a front left wheel when a magnitude of a reference value is greater than 1, calculating the compensation height control direction based on the vehicle's current vehicle height control level or a current vehicle height control level of the front left wheel when the magnitude of the reference value is 1, and calculating the compensation height control direction based on a current vehicle height control level of the front-right-wheel vehicle height when the magnitude of the reference value is less than 1. The detailed description of the above-described step is the same as or similar to that described above with reference to FIG. 3.

According to embodiments, the compensation height control direction included in the compensation height control information may indicate at least one of a front-right-wheel vehicle height upward direction or a front-left-wheel vehicle height downward direction in response to an event that the vehicle-pull direction indicates a left direction.

Step S6001 according to embodiments may be performed based on the reference value obtained by dividing a current vehicle height control level of the vehicle's front right wheel by a current vehicle height control level of the vehicle's front left wheel. Step S6001 according to embodiments may include calculating a compensation height control direction based on a current vehicle height control level of a front left wheel when a reference value is greater than 1, calculating the compensation height control direction based on the vehicle's current vehicle height control level or a current vehicle height control level of the front left wheel when the reference value is 1, and calculating the compensation height control direction based on a current vehicle height control level of the front-right-wheel vehicle height when the reference value is less than 1. The detailed description of the above-described step is the same as or similar to that described above with reference to FIG. 3.

When vehicle pulls occur, the apparatus according to embodiments may temporarily prevent vehicle pulls by compensating for a vehicle height through the method described in this drawing. Besides, the apparatus may provide efficient vehicle-pull compensation by appropriately adjusting a vehicle height depending on an extent to which vehicle pulls occur.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

Embodiments may provide a process of automatically compensating for vehicle pulls without dependence on a driver's manipulation when the vehicle pulls occur.

Furthermore, embodiments may provide a process of temporarily compensating for vehicle pulls until the driver's manual control by quickly controlling the height of a vehicle when the vehicle pulls occur.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle height adjustment control apparatus for compensating for vehicle pulls, the apparatus comprising:
a memory configured to store a program; and
a processor configured to execute the program, and configured to:
recognize that a vehicle is driven straight;
determine whether the vehicle pulls of the vehicle occur, in response to recognizing that the vehicle is driven straight; and
generate a warning message and to calculate compensation height control information of the vehicle in response to determining that the vehicle pulls occur, and
wherein the controller is configured to:
determine whether the vehicle pulls occur, based on a magnitude of a steering angle of the vehicle and a magnitude of a steering torque of the vehicle;
determine that the vehicle pulls occur, in response to an event that the magnitude of the steering angle is greater than a third threshold value and the magnitude of the steering torque is greater than a fourth threshold value; and
generate a vehicle-pull direction of the vehicle pulls and a vehicle-pull level of the vehicle pulls in response to determining that the vehicle pulls occur,
wherein the vehicle-pull direction indicates one of a right direction and a left direction,
wherein the vehicle-pull level is generated based on the magnitude of the steering angle and the magnitude of the steering torque,
wherein the compensation height control information includes a compensation height level and a compensation height control direction,
wherein the compensation height level is calculated based on the vehicle-pull level, and
wherein the compensation height control direction indicates at least one of a front-right-wheel vehicle height downward direction, a front-right-wheel vehicle height upward direction, a front-left-wheel vehicle height downward direction, or a front-left-wheel vehicle height upward direction.

2. The apparatus of claim 1, wherein the processor is configured to:
recognize whether the vehicle is driven straight, based on a magnitude of a lateral acceleration of the vehicle, a longitudinal speed of the vehicle, and a magnitude of a yaw rate of the vehicle.

3. The apparatus of claim 2, wherein the processor is configured to:
calculate a curvature of a road, on which the vehicle is driven, based on the longitudinal speed and the magnitude of the yaw rate; and
recognize that the vehicle is driven straight, in response to an event that the magnitude of the lateral acceleration is less than a first threshold value and the calculated curvature is less than a second threshold value.

4. The apparatus of claim 1, wherein the compensation height control direction included in the compensation height control information calculated by the processor indicates at least one of the front-right-wheel vehicle height downward direction or the front-left-wheel vehicle height upward direction, in response to an event that the vehicle-pull direction indicates a right direction.

5. The apparatus of claim 4, wherein the processor is configured to:
calculate the compensation height control information based on a magnitude of a reference value obtained by dividing a current vehicle height control level of a front left wheel of the vehicle by a current vehicle height control level of a front right wheel of the vehicle;
calculate the compensation height control direction based on the current vehicle height control level of the front left wheel when the magnitude of the reference value is greater than 1;
calculate the compensation height control direction based on a current vehicle height control level of the vehicle or the current vehicle height control level of the front left wheel when the magnitude of the reference value is 1; and
calculate the compensation height control direction based on the current vehicle height control level of the front right wheel when the magnitude of the reference value is less than 1.

6. The apparatus of claim 1, wherein the compensation height control direction included in the compensation height control information calculated by the processor indicates at least one of the front-right-wheel vehicle height upward direction or the front-left-wheel vehicle height downward direction in response to an event that the vehicle-pull direction indicates a left direction.

7. The apparatus of claim 6, wherein the processor is configured to:
calculate the compensation height control information based on a reference value obtained by dividing a current vehicle height control level of a front left wheel of the vehicle by a current vehicle height control level of a front right wheel of the vehicle;

calculate the compensation height control direction based on the current vehicle height control level of the front left wheel when the reference value is greater than 1;

calculate the compensation height control direction based on a current vehicle height control level of the vehicle or the current vehicle height control level of the front left wheel when the reference value is 1; and calculate the compensation height control direction based on the current vehicle height control level of the front right wheel when the reference value is less than 1.

8. A vehicle height adjustment control method for compensating for vehicle pulls, the method comprising:

recognizing, by a processor configured to execute the program stored in a memory, that a vehicle is driven straight;

determining, by the processor, whether the vehicle pulls of the vehicle occur, in response to recognizing that the vehicle is driven straight; and generating, by the processor, a warning message and calculating compensation height control information of the vehicle in response to determining that the vehicle pulls occur, and wherein the determining of whether the vehicle pulls of the vehicle occur, in response to recognizing that the vehicle is driven straight is performed based on a magnitude of a steering angle of the vehicle and a magnitude of a steering torque of the vehicle, wherein the determining of whether the vehicle pulls of the vehicle occur, in response to recognizing that the vehicle is driven straight includes:

determining that the vehicle pulls occur, in response to an event that the magnitude of the steering angle is greater than a third threshold value and the magnitude of the steering torque is greater than a fourth threshold value, and generating a vehicle-pull direction of the vehicle pulls and a vehicle-pull level of the vehicle pulls in response to determining that the vehicle pulls occur, wherein the vehicle-pull direction indicates one of a right direction and a left direction, and wherein the vehicle-pull level is generated based on the magnitude of the steering angle and the magnitude of the steering torque, wherein the compensation height control information includes a compensation height level and a compensation height control direction, wherein the compensation height level is calculated based on the vehicle-pull level, and wherein the compensation height control direction indicates at least one of a front-right-wheel vehicle height downward direction, a front-right-wheel vehicle height upward direction, a front-left-wheel vehicle height downward direction, or a front-left-wheel vehicle height upward direction.

9. The method of claim 8, wherein the recognizing that the vehicle is driven straight is performed based on a magnitude of a lateral acceleration of the vehicle, a longitudinal speed of the vehicle, and a magnitude of a yaw rate of the vehicle.

10. The method of claim 9, wherein the recognizing that the vehicle is driven straight includes:

calculating a curvature of a road, on which the vehicle is driven, based on the longitudinal speed and the magnitude of the yaw rate; and recognizing that the vehicle is driven straight, in response to an event that the magnitude of the lateral acceleration is less than a first threshold value and the calculated curvature is less than a second threshold value.

11. The method of claim 8, wherein the compensation height control direction included in the compensation height control information indicates at least one of the front-right-wheel vehicle height downward direction or the front-left-wheel vehicle height upward direction in response to an event that the vehicle-pull direction indicates a right direction.

12. The method of claim 11, wherein the generating of the warning message and the calculating of the compensation height control information of the vehicle in response to determining that the vehicle pulls occur is performed based on a magnitude of a reference value obtained by dividing a current vehicle height control level of a front left wheel of the vehicle by a current vehicle height control level of a front right wheel of the vehicle, and wherein the generating of the warning message and the calculating of the compensation height control information of the vehicle in response to determining that the vehicle pulls occur includes:

calculating the compensation height control direction based on the current vehicle height control level of the front left wheel when the magnitude of the reference value is greater than 1;

calculating the compensation height control direction based on a current vehicle height control level of the vehicle or the current vehicle height control level of the front left wheel when the magnitude of the reference value is 1; and calculating the compensation height control direction based on the current vehicle height control level of the front right wheel when the magnitude of the reference value is less than 1.

13. The method of claim 8, wherein the compensation height control direction included in the compensation height control information indicates at least one of the front-right-wheel vehicle height upward direction or the front-left-wheel vehicle height downward direction in response to an event that the vehicle-pull direction indicates a left direction.

14. The method of claim 13, wherein the generating of the warning message and the calculating of the compensation height control information of the vehicle in response to determining that the vehicle pulls occur is performed based on a reference value obtained by dividing a current vehicle height control level of a front left wheel of the vehicle by a current vehicle height control level of a front right wheel of the vehicle, and wherein the generating of the warning message and the calculating of the compensation height control information of the vehicle in response to determining that the vehicle pulls occur includes:

calculating the compensation height control direction based on the current vehicle height control level of the front left wheel when the reference value is greater than 1;

calculating the compensation height control direction based on a current vehicle height control level of the vehicle or the current vehicle height control level of the front left wheel when the reference value is 1; and calculating the compensation height control direction based on the current vehicle height control level of the front right wheel when the reference value is less than 1.

* * * * *